United States Patent [19]

Usui et al.

[11] Patent Number: 5,678,217
[45] Date of Patent: Oct. 14, 1997

[54] VIDEO SIGNAL SWITCHING DEVICE WITH DESCRAMBLER OUTPUT AND INPUT TERMINALS

[75] Inventors: Hirofumi Usui; Masanobu Matsuoka, both of Tokyo, Japan

[73] Assignee: Sony Corporation, Tokyo, Japan

[21] Appl. No.: 624,243

[22] Filed: Mar. 29, 1996

Related U.S. Application Data

[63] Continuation of Ser. No. 386,321, Feb. 10, 1995, abandoned, which is a continuation of Ser. No. 78,850, Jun. 21, 1993, abandoned.

[30] Foreign Application Priority Data

Jul. 31, 1992 [JP] Japan .................. 4-225233

[51] Int. Cl.$^6$ ............... H04B 1/18; H04N 5/450
[52] U.S. Cl. .................. 455/277.1; 455/179.1; 455/191.1; 348/11
[58] Field of Search ............... 455/176.1, 178.1, 455/179.1, 180.1, 188.1, 191.1, 272, 277.1, 278.1, 280, 275; 348/10, 11, 564, 565, 566, 567, 568; H04N 5/450, 7/167

[56] References Cited

U.S. PATENT DOCUMENTS

| | | | |
|---|---|---|---|
| 4,518,993 | 5/1985 | Okada et al. | 348/11 |
| 4,694,490 | 9/1987 | Harvey et al. | 348/10 |
| 4,890,322 | 12/1989 | Russell, Jr. | 348/10 |
| 5,047,867 | 9/1991 | Strubbe et al. | 348/564 |
| 5,083,205 | 1/1992 | Arai | 348/565 |

FOREIGN PATENT DOCUMENTS

| | | | |
|---|---|---|---|
| 0305651 | 3/1989 | European Pat. Off. | H04N 5/45 |
| 0194984 | 8/1986 | Japan | H04N 5/450 |
| A0194983 | 8/1986 | Japan | H04N 5/450 |
| A0057375 | 3/1987 | Japan | H04N 5/450 |
| 404207278 | 7/1992 | Japan | H04N 5/450 |
| 405056369 | 3/1993 | Japan | H04N 5/450 |
| 2232033 | 11/1990 | United Kingdom | H04N 5/450 |

*Primary Examiner*—Reinhard J. Eisenzopf
*Assistant Examiner*—Than H. Le
*Attorney, Agent, or Firm*—Jay H. Maioli

[57] ABSTRACT

An antenna switching device has a pair of first and second input terminals and a pair of first and second output terminals. It also has a first switch for selecting either of signals supplied to the first and second input terminals and for supplying the selected signal to the first output terminal, and a second switch for selecting either of the signals supplied to the first and second input terminals and for supplying the selected signal to the second output terminal.

3 Claims, 4 Drawing Sheets

VIDEO SIGNAL SWITCHING DEVICE WITH DESCRAMBLER OUTPUT AND INPUT TERMINALS This is a continuation of application Ser. No. 08/386,321 filed Feb. 10, 1995, abandoned, which is a continuation of application Ser. No. 08/078,850 filed Jun. 21, 1993, abandoned.

BACKGROUND OF THE INVENTION

1. Field of the Invention

The present invention relates to an antenna switching device having two input terminals and two output terminals.

2. Description of the Related Art

Referring to FIG. 5 in the accompanying drawings, a conventional antenna switching device 50 has two input terminals ANT IN and AUX IN and two output terminals MAIN OUT and SUB OUT. An antenna 4 is connected to the input terminal ANT IN. A signal that is input to the input terminal ANT IN is branched into two systems by a 10:1 branching filter 52. Of the two systems, a signal of −10 dB is amplified to 10 dB by an amplifier 54 and then supplied to the output terminal SUB OUT. On the other hand, a relatively high-level signal output from the branching filter 52 is supplied to the output terminal MAIN OUT via the A-side terminals of switches 56 and 58.

The switches 56 and 58 constitute an interlocking switch for selectively supplying the signal from the input terminal ANT IN and the signal from the input terminal AUX IN by a switching operation. When the switches 56 and 58 make a connection between the A-side terminals, the signal from the input terminal ANT IN is supplied to the output terminal MAIN OUT.

When the switches 56 and 58 make a connection between the B-side terminals, the signal from the input terminal ANT IN is output to a terminal TO CONV via the branching filter 52 and the switch 56. A descrambler 6 of a cable box is connected between the terminal TO CONV and the input terminal AUX IN so that the signal from the terminal TO CONV is descrambled and supplied to the input terminal AUX IN. Thus, the output terminal MAIN OUT is selectively supplied with the signal from the input terminals ANT IN and AUX IN by the switching operation of the interlocking switches 56 and 58.

In the picture-in-picture display mode of a television receiver, the signal from the output terminal MAIN OUT is displayed on the main screen (the display screen itself), while the signal from the output terminal SUB OUT is displayed on the sub-screen (a window formed in the main screen).

The above-described conventional antenna switching device suffers, however, from some problems as stated below.

Since the output terminal SUB OUT is supplied with only the signal from the input terminal ANT IN, the signal from the input terminal AUX IN cannot been displayed on the sub-screen. In the split screen display mode, it is impossible to display the signal from the input terminal ANT IN and the signal from the input terminal AUX IN in combination with each other.

SUMMARY OF THE INVENTION

In view of the above-described circumstances, it is an object of the present invention to provide an antenna switching device which enables signals supplied to two input terminals to be selectively output from either of two output terminals.

To this end, the present invention provides an antenna switching device having a pair of first and second input terminals (for example, input terminals ANT IN and AUX IN in an embodiment, described later) and a pair of first and second output terminals (for example, output terminals MAIN OUT AND SUB OUT in the embodiment). The antenna switching device includes a first selecting device (for example, a switch 8 in the embodiment) for selecting either of signals supplied to the first and second input terminals and for supplying the selected signal to the first output terminal, and a second selecting device (for example, a switch 10 in the embodiment) for selecting either of the signals supplied to the first and second input terminals and for supplying the selected signal to the second output terminal.

According to the antenna switching device of the present invention, the first selecting device selects either of the signals supplied to the first and second input terminals and supplies it to the first output terminal, and the second selecting means selects either of the signals supplied to the first and second input terminals and supplies it to the second output terminal. Accordingly, it is possible to solve the problem that either of the signals supplied to the first and second input terminals cannot be supplied to a specific output terminal. Thus, in the picture-in-picture display mode, either of the signals supplied from the two input terminals can be displayed on the sub-screen, and in the split screen display mode, the signals from the two input terminals can be displayed in combination with each other.

BRIEF DESCRIPTION OF THE DRAWINGS

The above and other objects, features and advantages of the present invention will become more apparent from the following description of a preferred embodiment thereof, taken in conjunction with the accompanying drawings, in which like reference numerals denote like elements, and of which.

DESCRIPTION OF THE PREFERRED EMBODIMENT

The present invention will be described below in detail with reference to the accompanying drawings.

Figure 1:
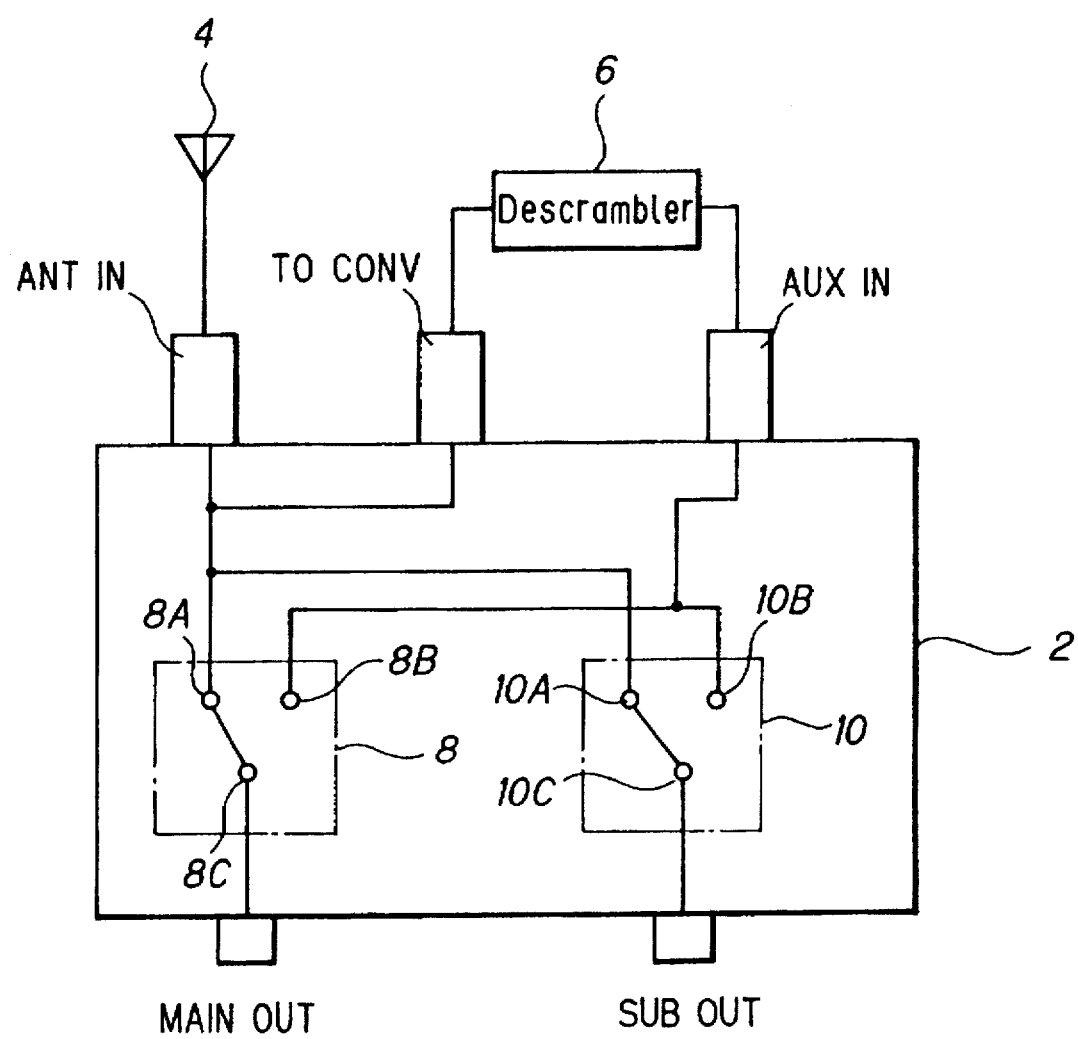
FIG. 1 is a connection diagram showing the arrangement of one embodiment of the antenna switching device according to the present invention.

FIG. 1 shows the arrangement of one embodiment of the antenna switching device according to the present invention. An antenna switching device 2 has two input terminals ANT IN and AUX IN and two output terminals MAIN OUT and SUB OUT. An antenna 4 is connected to the input terminal ANT IN. The input terminal ANT IN is connected to both a terminal 8A of a first switch 8 and a terminal 10A of a second switch 10 and further connected to a terminal TO CONV. The switches 8 and 10 operate independently of each other.

A descrambler 6 of a cable box is connected between the terminal TO CONV and the input terminal AUX IN so that the signal from the terminal TO CONV is descrambled and supplied to the input terminal AUX IN. The input terminal AUX IN is connected to both a terminal 8B of the switch 8 and a terminal 10B of the switch 10.

A terminal 8C of the switch 8 is connected to the output terminal MAIN OUT. A terminal 10C of the switch 10 is connected to the output terminal SUB OUT.

When the switch 8 makes a connection between the terminals 8A and 8C, the output terminal MAIN OUT is supplied with the signal from the input terminal ANT IN, that is, the signal from the antenna 4.

When the switch 10 makes a connection between the terminals 10B and 10C, the output terminal SUB OUT is supplied with the signal from the input terminal AUX IN, that is, the signal from the antenna 4 descrambled through the descrambler 6.

When the switch 8 makes a connection between the terminals 8B and 8C, the output terminal MAIN OUT is supplied with the signal from the input terminal AUX IN, that is, the signal from the antenna 4 descrambled through the descrambler 6.

When the switch 10 makes a connection between the terminals 10A and 10C, the output terminal SUB OUT is supplied with the signal from the input terminal ANT IN, that is, the signal from the antenna 4.

Thus, the output terminal SUB OUT is also selectively supplied with the signal from the input terminal AUX IN. Therefore, in the picture-in-picture display mode, the signal from the input terminal AUX IN, that is, the signal from the antenna 4 descrambled through the descrambler 6, can be displayed on the sub-screen. In the split screen display mode, the signal from the input terminal ANT IN and the signal from the input terminal AUX IN can be displayed in combination with each other. Further, the signal output from the output terminal MAIN OUT and the signal output from the output terminal SUB OUT can be exchanged (swapped) for each other regardless of the usage.

Figure 2:
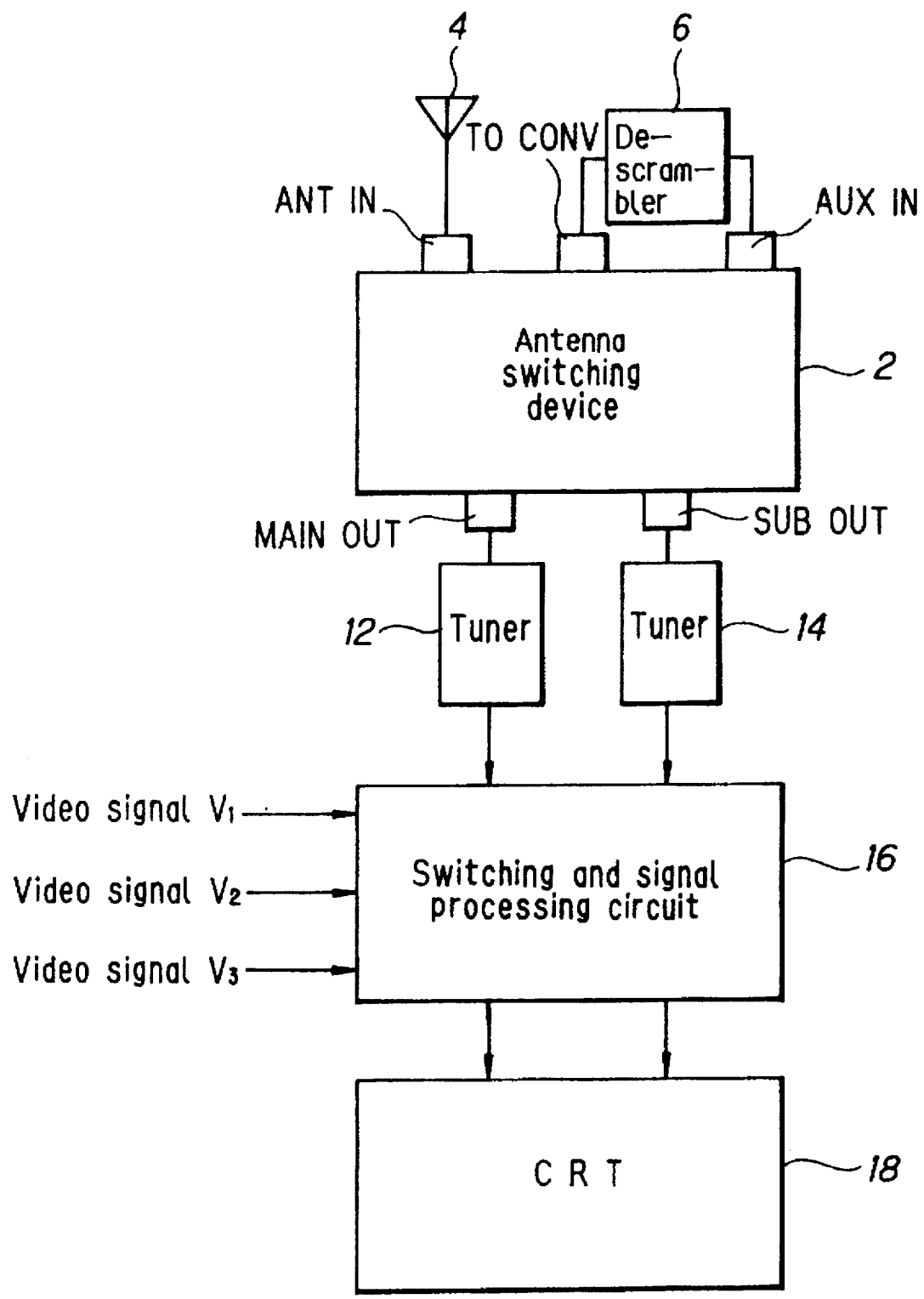
FIG. 2 is a block diagram showing one example of the arrangement of a television receiver that uses the embodiment shown in FIG. 1.

FIG. 2 shows one example of the arrangement of a television receiver that uses the embodiment shown in FIG. 1. In FIG. 2, the antenna switching device 2, the antenna 4 and the descrambler 6 are the same as those shown in FIG. 1. The output terminals MAIN OUT and SUB OUT are respectively connected to tuners 12 and 14 for selection of a desired television signal, that is, channel selection.

Video signals output from the tuners 12 and 14 are supplied to a switching and signal processing circuit 16, together with other video signals V1, V2 and V3. The switching and signal processing circuit 16 selects desired video signals from among the video signals from the tuners 12 and 14 and the other video signals V1, V2 and V3 in response to a command from a remote controller or other similar controller. The signal processing circuit 16 subjects the selected video signals to signal processing for the picture-in-picture display mode or the split screen display mode, and supplies the resulting signals to a CRT (Cathode-Ray Tube) 18.

Figure 3:
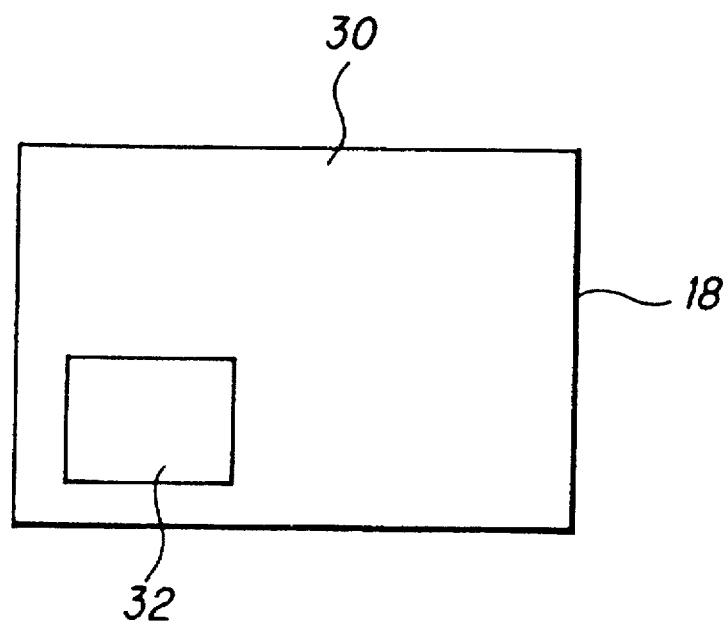
FIG. 3 is a view for explanation of a picture-in-picture display function.

If the signal processing circuit 16 selects the output signals from the tuners 12 and 14, for example, and executes signal processing for the picture-in-picture display mode, the signal that is selected by the tuner 12 from the output signals supplied to the output terminal MAIN OUT of the antenna switching device 2 is displayed on the main screen 30, as shown in FIG. 3, whereas the signal that is selected by the tuner 14 from the output signals supplied to output terminal SUB OUT of the antenna switching device 2 is displayed on the sub-screen 32, as shown in FIG. 3. Since the output signals from the input terminals ANT IN and AUX IN are selectively supplied to the output terminal SUB OUT, as has been described above, the output signal from the input terminal AUX IN can also be displayed on the sub-screen 32.

Figure 4:
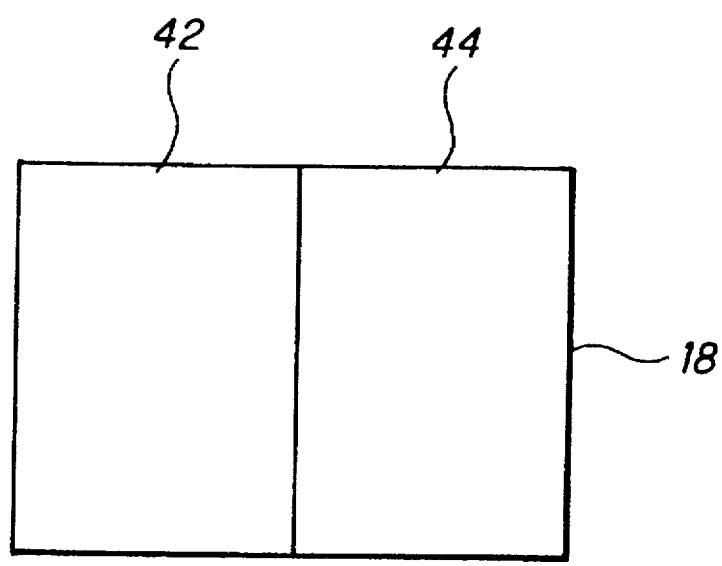
FIG. 4 is a view for explanation of a split screen display mode.
Figure 5:
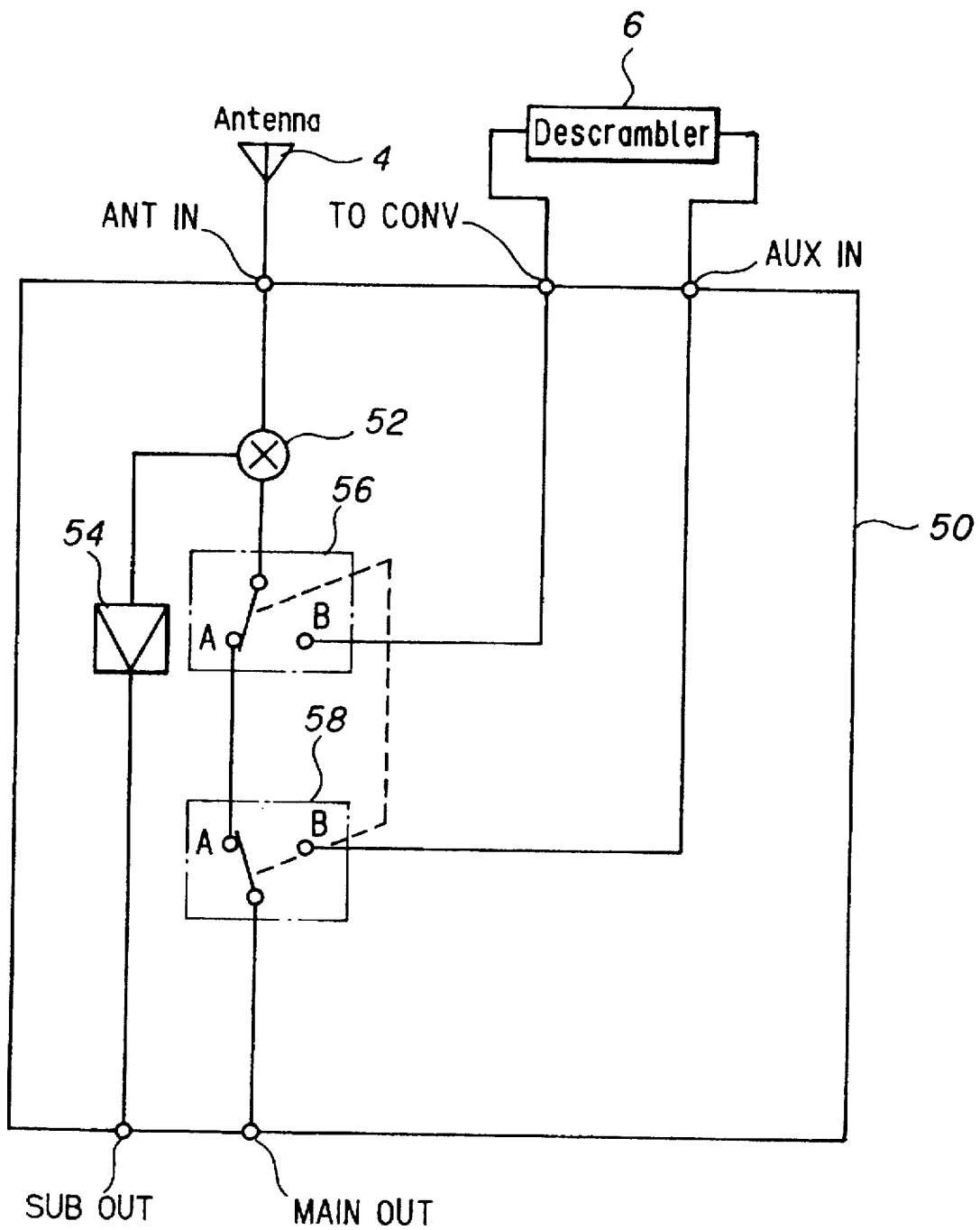
FIG. 5 is a connection diagram showing the arrangement of a conventional antenna switching device.

If the signal processing circuit 16 selects the output signals from the tuners 12 and 14, for example, and executes signal processing for the split screen display mode, the signal that is selected by the tuner 12 from the output signals supplied to the output terminal MAIN OUT of the antenna switching device 2 is displayed on the left-hand screen 42, for example, as shown in FIG. 4, whereas the signal that is selected by the tuner 14 from the output signals supplied to the output terminal SUB OUT of the antenna switching device 2 is displayed on the right-hand screen 44, for example, as shown in FIG. 4. In addition, it is possible to supply the signal from the input terminal ANT IN to the output terminal MAIN OUT and the signal from the input terminal AUX IN to the output terminal SUB OUT, as has been described above. Therefore, it is possible to display the signal from the input terminal ANT IN on the left-hand screen 42, shown in FIG. 4, and the signal from the input terminal AUX IN on the right-hand screen 44, shown in FIG. 4.

Although the present invention has been described through specific terms, it should be noted here that the described embodiment is not necessarily exclusive and that various changes and modifications may be imparted thereto without departing from the scope of the invention which is limited solely by the appended claims.

What is claimed is:

1. An antenna switching device receiving a signal from an antenna for providing to a first tuner one of a received video signal and a descrambled video signal descrambled by a descrambler device and for providing to a second tuner one of the received video signal and the descrambled video signal, the device comprising:

a video signal input terminal for receiving the signal from the antenna and for supplying the received video signal;

a video signal converter terminal connected to the video signal input terminal for supplying to the descrambler device the received video signal supplied from the video signal input terminal;

a descrambled video signal input terminal for receiving a signal from the descrambler device which has been descrambled by the descrambler device from the video signal supplied through the video signal converter terminal and for supplying the descrambled signal received from the descrambler device as the descrambled video signal;

a first output terminal connected to an input of the first tuner, said first tuner being adapted to discriminate one of a plurality of signal components of the output from the first output terminal;

first selecting means for connecting either the received video signal from the video signal input terminal or the descrambled video signal from the descrambled video signal input terminal to the input of the first tuner through the first output terminal;

a second output terminal connected to an input of the second tuner, said second tuner being adapted to discriminate one of a plurality of signal components of the output from the second output terminal; and second selecting means operating independently from the first selecting means for connecting either the received video signal from the video signal input terminal or the descrambled video signal from the descrambled video signal input terminal to the input of the second tuner through the second output terminal, independent operation of the first and second selecting means causing connection of either the same or different ones of the received video signal and the descrambled video signal to the respective inputs of the first and second tuners.

2. An antenna switching device according to claim 1 further comprising signal processing means connected to the first and second tuners for executing signal processing to display an output from the first tuner on a main screen and to display an output from the second tuner on a sub-screen.

3. An antenna switching device according to claim 1 further comprising signal processing means connected to the first and second tuners for executing processing to display simultaneously two output signals supplied respectively from the first and second tuners on split screen display areas in combination with each other.

* * * * *